Patented June 18, 1940

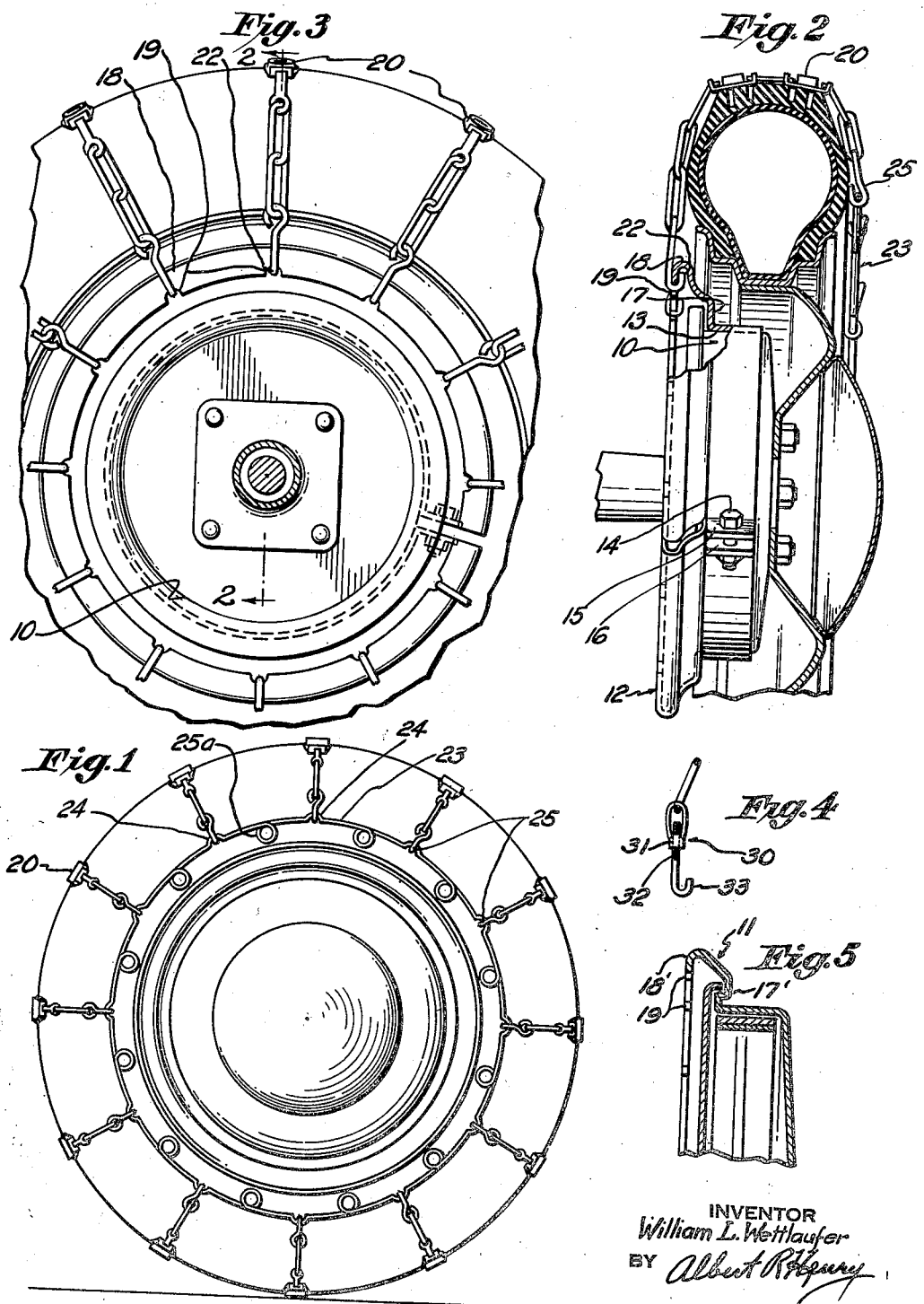

2,204,783

UNITED STATES PATENT OFFICE 2,204,783

TRACTION DEVICE

William L. Wettlaufer, Buffalo, N. Y.

Application January 25, 1939, Serial No. 252,790

5 Claims. (Cl. 152—233)

This invention relates to non-skid attachments for use on an automotive vehicle.

The act of installing a set of tire chains has proved an increasingly toilsome task during recent years, as the result of the space limitations imposed by modern fender and wheel design. Such chains are now formed of material of extremely heavy section in order to resist the strains and wear imposed by increased power and modern concrete roads. Due to this cumbersome structure, the use of such chains has proved unsatisfactory, and productive of the transmittal of destructive vibratory forces to the driving train of the vehicle.

In the present invention it is proposed to eliminate entirely such floating types of mounting by providing an extension to the brake drums of the vehicle, which extension serves as a permanent anchorage for a plurality of light weight traction units. These units are installed by a simple assembling procedure, with only a fraction of the effort necessary to install previous types of chains. The invention also includes an automatic tensioning device for the traction units, which aids to retain the units in proper position at all rates and positions of rotation, thus eliminating the familiar slap impact of former structures, and permitting, as a result, higher road speeds without danger of breakage or the development of dynamic unbalance in the wheels. These and other features of the invention are more specifically set forth in the accompanying specification and drawing, wherein:

Fig. 1 is a side view of an automobile wheel assembly having the non-skid attachment of the invention applied thereto;

Fig. 2 is an enlarged section on the line 2—2 of Fig. 3;

Fig. 3 is a fragmentary side view of the attachment as seen from the inside or brake drum side of the wheel;

Fig. 4 is a fragmentary view showing an adjustment means applied to one of the non-skid elements; and Fig. 5 is a section through a brake drum, showing the adapter ring formed integrally with the drum.

The invention is organized with the brake drums 10 of the vehicle, and consists either of an integral circular extension 11, as in Fig. 5, or an adapter 12 (Figs. 2 and 3), which is secured about each drum. The adapter consists of a split cup-shaped member having a base 13 of reduced diameter, suited to be applied about the drum 10 and clamped rigidly thereon by a bolt 14 which engages through pierced lugs 15, 16. A radially extending portion 17 projects from the inner side of the base 13, and it terminates in a reentrant flanged periphery 18 having regularly spaced receiving means or notches 19. The integral structure of Fig. 4 may be formed in a similar manner, as indicated by the numerals 17', 18', 19'.

The adapter 12 serves as a mounting base for a plurality of individual traction units 20, such units each having inner terminal hooks 22 which engage in the notches 19 of the adapter. The units may be of any known type of non-skid device, but I prefer to use the type shown in my Patent No. 2,158,264, because of its lightness of weight and quietness of operation. A ring 23 of spring steel serves as an anchorage for the opposite extremities of the units 20, and it is formed with spaced bent portions 24 which serve as sockets for receiving the outer terminal hooks 25 of the units. A spring loop section 25a is formed between each pair of bent portions 24 to provide expansion means.

The application of the units 20 is a relatively simple task, consisting of reaching about to the rear of the wheel, engaging a unit in each available notch 19 of the adapter, and springing the outer ring 23 sufficiently to enter the outer hooks in the proper bent seats thereof. Advancing the automobile a short distance renders the remaining notches available to complete the operation. Each unit is thus retained in tight engagement with the tire by an individual spring arrangement on the ring 23, and it will be apparent that stress transmission between adjacent sections of the ring provides an equalizing effect against road shocks, as well as an automatic take-up for wear between the articulations of the traction units.

Each unit 20 may, if desired, be supplied with a terminal 30 (Fig. 5) having a nut portion 31 for receiving the threaded shank 32 of a hook 33. This provides means for maintaining all of the units at a uniform length during their useful life.

It will be understood that the invention may be embodied in various other manners without departing from the inventive concept as set forth in the accompanying claims.

I claim:

1. The combination with a wheel assembly including a brake drum and a resilient tire, of a circular extension on said drum having a peripheral reentrant flange portion formed with a plurality of radially spaced notches, a plurality of traction devices for said tire having securing means at each extremity, one securing means of each device being entered in a notch of said flange portion, a resilient circular ring bent to form a plurality of spaced socket portions thereon, said ring being disposed on the outside of the assembly with the remaining securing means being attached to the sockets thereof, said ring being flexible to permit manual application of the securing means under tension.

2. The combination with a wheel assembly including a brake drum and a resilient tire, of a plurality of independent traction devices for said tire, means associated with the drum for securing the common ends of the devices, and a resilient circular steel ring disposed on the outside of the assembly and bent to form a plurality of spaced socket portions thereon for securing the remaining common ends of the traction devices, said ring being formed intermediate said socket portions with an integral spring section, whereby said ring may be flexed to permit application of the traction devices under tension.

3. The combination with a wheel assembly including a brake drum and a resilient tire, of an adapter having a cylindrical portion adapted to be clamped to the drum and an integral radial disc portion terminating in a peripheral reentrant flange, said flange being formed with a plurality of radially spaced notches, a plurality of traction devices for said tire having securing hooks at each extremity, said devices being secured at one extremity by entry of the hooks thereof in the notches of the adapter flange, and means on the exterior side of the wheel for securing the remaining hooks of the traction devices.

4. A non-skid attachment for an automobile wheel including a plurality of separate traction devices having securing means at each extremity, radially spaced means on the inner side of the wheel for attaching one of the securing means of each device, a resilient circular ring bent to form a plurality of spaced socket portions thereon, said ring being disposed on the outside of the wheel with the remaining securing means being attached to the sockets thereof, said ring being flexible to permit manual application of the securing means under tension.

5. A non-skid attachment for an automobile wheel including a plurality of traction devices and means disposed on the inner side of the wheel for securing one extremity of each traction device, attaching means for the remaining extremities of the traction devices comprising a resilient circular ring formed with bent attaching sockets and spring sections intermediate said sockets, whereby said ring may be flexed to permit application of the traction devices under tension.

WILLIAM L. WETTLAUFER.